United States Patent
Espiard et al.

(10) Patent No.: US 6,893,579 B2
(45) Date of Patent: May 17, 2005

(54) INSULATION PRODUCT IN PARTICULAR THERMAL CONTAINING A BINDER BASED ON PHENOL-FORMALDEHYDE RESIN AND METHOD FOR MAKING SAME

(75) Inventors: Philippe Espiard, Gouvieux (FR); Bruno Mahieuxe, Neuilly sous Clermont (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 10/297,589

(22) PCT Filed: Jun. 13, 2001

(86) PCT No.: PCT/FR01/01824

§ 371 (c)(1),
(2), (4) Date: May 1, 2003

(87) PCT Pub. No.: WO01/96254

PCT Pub. Date: Dec. 20, 2001

(65) Prior Publication Data

US 2003/0171474 A1 Sep. 11, 2003

(30) Foreign Application Priority Data

Jun. 13, 2000 (FR) .............................. 00 07535

(51) Int. Cl.[7] .............................................. C03C 25/34
(52) U.S. Cl. ...................... 252/62; 427/389.8; 428/376; 524/841; 442/180; 442/331
(58) Field of Search ........................ 252/62; 427/389.8; 428/375; 65/451; 524/841; 442/180, 331; 528/145, 162, 164, 165

(56) References Cited

U.S. PATENT DOCUMENTS

| 3,684,467 A | | 8/1972 | Smucker et al. | |
|---|---|---|---|---|
| 3,932,334 A | * | 1/1976 | Deuzeman et al. | ......... 524/541 |
| 5,358,748 A | | 10/1994 | Dornfield et al. | |
| 6,132,549 A | * | 10/2000 | Nieckarz et al. | ............ 156/335 |
| 6,342,271 B1 | * | 1/2002 | Lericque et al. | ......... 427/385.5 |

FOREIGN PATENT DOCUMENTS

| EP | 0 148 050 | | 7/1985 |
|---|---|---|---|
| GB | 905 393 | | 9/1962 |
| WO | WO 99/03906 | * | 1/1999 |

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

Insulating product based on mineral wool sized with a binder based on a phenol-formaldehyde resin, in which the binder comprises, as a mixture:

60 to 90 parts by weight of a phenol-formaldehyde resol having a free formaldehyde content of less than or equal to 25% by weight with respect to the dry weight of resin and a free phenol content of less than or equal to 2.5% by weight with respect to the dry weight of resin, obtained by condensation in basic medium of phenol (P) and formaldehyde (F) in an F/P molar ratio of around 2.5 to 4 until the condensation product neutralized by sulphuric acid has a water dilutability of greater than 500% and less than or equal to 1500%;

10 to 40 parts by weight of urea.

Use of such a sizing composition for manufacturing insulating products, while reducing the emissions of ammonia gas on the manufacturing line.

23 Claims, No Drawings

INSULATION PRODUCT IN PARTICULAR THERMAL CONTAINING A BINDER BASED ON PHENOL-FORMALDEHYDE RESIN AND METHOD FOR MAKING SAME

The invention relates to the field of insulation products, especially thermal or acoustic insulation products, based on mineral wool and an organic binder based on a phenol-formaldehyde resin. It relates more particularly to the reduction in the emission of various pollutants during the manufacture of such products based on mineral wool, which comprises a first step of manufacturing the wool itself by fiberizing and drawing, and a forming step in which the mineral wool is collected on a receiving member in the form of a sheet. To ensure cohesion of the sheet, a sizing composition, which contains a thermosetting resin, is sprayed onto the wool as it travels towards the receiving member. The sheet thus treated is then subjected to an oven heat treatment in order to crosslink the resin and obtain a product having desirable properties, such as dimensional stability, mechanical strength, thickness recovery after compression and uniform colour.

Sizing compositions are generally in the form of an aqueous composition containing a phenol-formaldehyde resin and additives such as a catalyst for curing the resin, a silane adhesion promoter, antidusting mineral oils, etc.

In order for the composition to be capable of being delivered, most generally by spraying, it is necessary for the resin to be sufficiently dilutable in water. For this purpose, it is customary to carry out the condensation reaction between formaldehyde and phenol by limiting the degree of condensation of the monomers, in order to avoid the formation of long chains which are not very hydrophilic and reduce the dilutability. Consequently, the resin contains a certain proportion of monomers that have not reacted, in particular formaldehyde, the volatility of which may result in undesirable emissions of organic compounds into the factory's atmosphere.

This is why the phenol-formaldehyde condensation product is generally made to react with urea, which traps the free formaldehyde, forming non-volatile condensation products. The presence of urea in the resin also has a major economic advantage owing to its low cost, as it is possible to introduce it in a relatively large amount without substantially affecting the properties of the resin, especially the mechanical properties of the final product, thereby appreciably reducing the total cost of the resin.

Nevertheless, it has been found that this solution is not entirely satisfactory as regards atmospheric pollution since the urea-formaldehyde condensation products prove to be not very heat stable so that when the resin is used to size mineral wool, during which the resin is exposed to temperatures of greater than 100° C., the urea-formaldehyde condensation product, under the effect of heat, gives back urea, formaldehyde and ammonia gas which are released into the atmosphere of the factory.

The object of the present invention is to make the manufacture of insulation products less polluting, more particularly as regards the emissions of ammonia on the manufacturing line, without increasing the production cost of the insulating product.

The invention is based on the observation that it is possible to reduce the emissions of ammonia significantly during manufacture of an insulating product while using a sizing composition which retains a certain proportion of urea and which is therefore of competitive cost.

In this regard, the subject of the invention is an insulating product based on mineral wool sized with a binder based on a phenol-formaldehyde resin, characterized in that the binder comprises, as a mixture:
  60 to 90 parts by weight of a phenol-formaldehyde resol having a free formaldehyde content of less than or equal to 25% (by weight with respect to the dry weight of resin) and a free phenol content of less than or equal to 2.5% by weight with respect to the dry weight of resin, obtained by condensation in basic medium of phenol (P) and formaldehyde (F) in an F/P molar ratio of around 2.5 to 4 until the condensation product neutralized with sulphuric acid has a water dilutability of greater than 500% and less than or equal to 1500%;
  10 to 40 parts by weight of urea.

According to the invention, the free phenol content is firstly limited by pushing the condensation reaction to an extent sufficient for this minority raw material to be almost completely consumed. With an F/P ratio of greater than 1, but not too high, preferably less than equal to 3.2, the condensation takes place with the formation of moderately high molecular weight species, and consequently with a greater consumption of formaldehyde than that which would result in very long phenol-formaldehyde condensate chains.

Next, once the resol condensation reaction has been completed, the remaining formaldehyde molecules present in free form are scavenged by means of urea, the amount of which may be smaller, the lower the content of free formaldehyde in the resol.

It is thus possible to limit the proportion of urea in the binder mixture, while maintaining low contents of free volatile organic compounds in the binder. It is therefore possible to limit the emissions of volatile organic compounds such as phenol and formaldehyde, while reducing the amount of ammonia given off on the manufacturing line.

To monitor the progress of the resol formation reaction under the required conditions for the invention, three characteristic parameters are measured:
  the free phenol content and the free formaldehyde content which characterize the progress of the reaction; and
  the dilutability of the neutralized resol, which characterizes the length of the condensates formed.

According to the invention, the free phenol content of the resol before the addition of urea is less than or equal to 2.5% by weight of phenol with respect to the dry weight of resin, for a resol having a solids content of around 35 to 45%. Preferably, the free phenol content is less than or equal to 2% with respect to the dry weight of resin, advantageously less than or equal to 1.7% with respect to the dry weight of resin. In particular, it may be around 0.5 to 1.7%, for example 0.7 to 1.6%, with respect to the dry weight of resin.

The free formaldehyde content of the resol is less than or equal to 25% with respect to the dry weight of resin for a resol having a solids content of between 35 and 45. Preferably, the free formaldehyde content is less than or equal to 20%, advantageously less than or equal to 15.5% and in particular less than or equal to 12% with respect to the dry weight of the resin. In particular, it may be around 2 to 4%.

The dilutability of the resol corresponds to the maximum dilution factor of the resol for which no permanent turbidity of the dilution is observed. The dilutability is expressed as the volume of water, as a percentage of the volume of resol, which can be added to the resol before creating permanent turbidity. Thus, a dilutability of 1500% means that it is possible to dilute 10 ml of resin with 15×10 ml of water without the mixture becoming turbid. In general and according to the invention, this measurement is made using, for the dilution, deionized water at a moderate temperature, that is to say water at room temperature, of around 15 to 25° C., generally about 20° C. (within this temperature range, the dilutability does not vary significantly).

According to the invention, the progress of the condensation is monitored by measuring the dilutability of the resol neutralized with sulphuric acid. This is because it has been found in general that the resol synthesized in basic medium has a high dilutability at basic pH (in general at pH 9) with a relatively small variation, even when it contains very high molecular weight species. In contrast, when the resol is neutralized with sulphuric acid, the dilutability varies, decreasing markedly when the molecular weight of the phenol-formaldehyde condensates increases. It is thus possible to monitor the presence of compounds of undesirable molecular weight.

According to the invention, the resols used are therefore characterized by a dilutability of greater than 500 and less than or equal to 1500% in the state neutralized with sulphuric acid; preferably, the dilutability is more than 500 to 1000% in the neutralized state. Neutralization is understood to mean the addition of an amount of $H_2SO_4$ sufficient to react with all the hydroxyl groups $OH^-$ introduced by the basic catalyst.

Such resols may advantageously be synthesized by making phenol react with formaldehyde in the presence of a basic catalyst, such as sodium hydroxide, at a temperature of around 50 to 80° C., especially 60 to 75° C., in particular about 70° C., for a time of around 80 to 200 minutes, especially 90 to 150 minutes, the time being shorter, the higher the temperature and/or the lower the F/P ratio. In this regard, an F/P ratio limited to 3.2 is preferable, in order to avoid excessively long reaction times.

The basic catalyst, known per se, especially sodium hydroxide but also potassium hydroxide, calcium oxide or barium hydroxide, is in general used in an amount corresponding to 6 to 20 mol of $OH^-$ hydroxyl equivalents per 100 mol of initial phenol. The hot condensation step is generally followed by gradual cooling down to room temperature.

To prevent undesirable continuation of the condensation reaction, it is desirable to deactivate the basic catalyst by neutralizing the resol. Neutralization with sulphuric acid is not indicated, as it lowers the dilutability below 1500%, which in general is the threshold guaranteeing good processability on the spraying line.

Thus, the resol used according to the invention is advantageously neutralized with at least one acid chosen from boric acid or an equivalent borate (especially ammonium borate, sodium metaborate, sodium tetraborate or polyborate of an amino alcohol), sulfamic acid or an equivalent sulfamate, or an amino acid (especially aspartic acid, glutamic acid, amino acetic acid, etc.). This is because these acids have the property of modifying the resol in such a way that its dilutability is higher in the neutralized medium thus obtained than in the medium obtained with sulphuric acid. Advantageously, the neutralization takes place until a pH of around 7 to 9 is obtained.

The product of neutralization with one of the aforementioned acids of a resol having the features of the invention has in general a dilutability of greater than 1000% and ranging up to more than 2000% (it is customary to say that a dilutability of greater than 2000% is infinite) just after neutralization, and a dilutability of greater than or equal to 1000% is retained after storage for three weeks at about 12° C. with gentle stirring.

As a variant, the resol may be neutralized with any acid, but in the presence of an emulsifier such as an anionic surfactant and/or a gum, especially guar and ghatti gums, or possibly casein. The acid used may then be chosen from all strong acids known per se, such as sulphuric acid and hydrochloric acid, but also boric acid, sulfamic acid (or the equivalent salts) or an amino acid.

The preparation of a binder that can be used according to the invention comprises the cold-mixing of a resol, as described above, with a limited amount of urea. According to the invention, the mixture comprises 60 to 90 parts by weight of resol (measured by weight of dry matter of the resol) per 40 to 10 parts by weight of urea. Preferably, the mixture comprises at least 65 parts, especially from 70 to 85 parts, by dry weight of resol per at most 35 parts, especially 15 to 30 parts, by weight of urea.

The urea may be added immediately after the resol has been cooled, preferably after neutralization, so as to form a storage-stable premix, which can be used subsequently for formulating the sizing, or else it can be added at the very moment of formulating the sizing for a manufacturing run. The use of urea in a premix may, however, be preferred because it generates fewer emissions of pollutants, including ammonia, on the manufacturing line.

Urea is not the only compound that can be used to trap formaldehyde and it is possible, in particular, to also add ammonium sulphite in an amount of 1 to 20 parts by weight, especially 1 to 10 parts by weight, per 100 parts by dry weight of the resol+urea mixture. It has turned out that ammonium sulphite does not affect very substantially the emissions of ammonia, despite the introduction of ammonium ions that it constitutes in the sizing. However, it is preferable to limit the ammonium sulphite content to about 1 to 5 parts by weight, especially around 2 parts by weight, per 100 parts by weight of dry matter of resin and of urea.

The composition of the sizing may furthermore contain the other usual ingredients, such as:
ammonium sulphate as curing catalyst, preferably in an amount from 1 to 5 parts by weight per 100 parts by weight of dry matter of resin and of urea;
one or more silicones; and
one or more mineral oils.

Ordinarily, a sizing composition may furthermore include aqueous ammonia. To minimize the emissions of ammonia gas on the manufacturing line, it is preferable that the sizing be completely free of aqueous ammonia. However, it seems that an aqueous ammonia content of less than or equal to 5 parts by weight of 20% solution per 100 parts by weight of resin+urea dry matter makes it possible to remain below the permissible threshold for correct manufacture.

The proportion of sizing in the insulating product is generally around 1 to 12% by weight of dry matter with respect to the total weight of mineral wool.

The subject of the invention is also a sizing composition as described above.

According to another aspect, the subject of the invention is the use of a sizing composition as described above for reducing the emissions of ammonia gas during the manufacture of an insulating product.

According to the invention, the emissions of ammonia gas can be limited to less than 10 grams of ammonia gas per kilogram of mineral wool, in particular less than 8 g/kg, especially at most 5 g/kg.

The subject of the invention is also a process for manufacturing an insulating product based on mineral wool sized with a phenol-formaldehyde binder as described above, in which the cumulative emissions of ammonia gas over all the manufacturing steps are less than 10 grams of ammonia gas per kilogram of mineral wool.

The invention is illustrated by the following examples.

EXAMPLE 1

A phenol-formaldehyde resin was prepared by introducing 100 kg of phenol and 241 kg of formaldehyde in a 37% aqueous solution into a reactor, with stirring maintained throughout the manufacturing cycle, and the temperature in the reactor was raised to 45° C. The formaldehyde/phenol molar ratio was 2.8.

While keeping the temperature at 45° C., 12.7 kg of sodium hydroxide were regularly added over a period of 30 minutes, the sodium hydroxide being in a 47% aqueous solution, i.e. a sodium hydroxide/phenol weight ratio of 6%, i.e. a molar ratio of 14.1%.

Immediately after this addition, the temperature was raised to 70° C. over 30 minutes and this temperature was maintained for a time of about 120 minutes. After this time, the dilutability of the resol neutralized with sulphuric acid was 1200%.

The reactor and the reaction mixture were then cooled from 70° C. to 35° C. over 35 minutes.

The pH of the reaction mixture was then adjusted to 7.2 with sulfamic acid as a 15% aqueous solution (approximately 88 kg). The operation took about 90 minutes, while allowing the reaction mixture to cool down to 20° C.

The neutralized resol had a free formaldehyde content of 2.5% by weight of the resol, i.e. 6.8% with respect to the weight of dry matter of the resin, and a free phenol content of 0.5% by weight of resol, for a solids content of 37%, i.e. 1.4% with respect to the dry matter.

The dilutability of the resol neutralized with sulfamic acid was infinite (greater than 2000%) and remained so for a week's storage at 12° C. with gentle stirring. After three weeks' storage under these conditions, the dilutability was 1000%.

This resin was used to formulate four sizing compositions, including three based on a resol/urea premix, the formulations of which are given in Table 1 below.

These sizings were used on a line for manufacturing insulating products based on glass wool: the sizing was diluted so as to be sprayed onto the glass wool filaments before they were received on a conveyor belt contained in a receiving chamber provided with suction means in order to force the glass wool onto the belt. The conveyor belt passed through a forming zone in which the glass wool could be compressed vertically and possibly longitudinally, and then conveys the formed mass into a binder crosslinking oven in which the temperature was about 280° C.

The binder content of the product was measured by the loss on ignition of the latter, which in this case was 4.5% of the total weight of product.

The gas emissions were sampled at all points on the manufacturing line, especially in the forming zone, at the inlet and at the outlet of the oven, and the phenol, formaldehyde and ammonia contained in these samples were measured. The cumulative emissions over the entire line are given in Table 1 below.

Trial 1 shows that by adding ammonium sulphite, certainly the level of ammonia gas emissions rises somewhat, as a result of the presence of the ammonium ions, but the level of free formaldehyde is remarkably low.

An advantageous variant consists in omitting the aqueous ammonia, while keeping the ammonium sulphite, possibly in a reduced amount.

Trial 2, which uses a resin+urea premix and does not involve aqueous ammonia, gives very good emission results both as regards formaldehyde and ammonia gas.

The addition of aqueous ammonia to the premix of Trial 3 makes it possible to reduce the level of formaldehyde emitted, with an emitted ammonia gas content which remains tolerable.

Finally, the addition of ammonium sulphite in Trial 4 makes it possible to furthermore reduce the level of formaldehyde emitted, with an emitted ammonia gas content which also remains tolerable.

TABLE 1

| Example (trial) | Formulation (resin/urea)*/ammonium sulphate/20% aqueous ammonia/ammonium sulphite *: (resin/urea) in brackets in the case of a premix | Emissions (g/kg of glass) | | |
|---|---|---|---|---|
| | | Free phenol | Formaldehyde | Ammonia gas |
| 1 (1) | 80/20/2,5/5/5 | 0.7 | 0.2 | 1.2 |
| 1 (2) | (75/25)/1/0/0 | 0.6 | 0.4 | 1.2 |
| 1 (3) | (75/25/2 20% aqueous ammonia) /2/0/0 | 0.6 | 0.3 | 1.2 |
| 1 (4) | (75/25/2 20% aqueous ammonia) /2/0/2 | 0.6 | 0.3 | 0.9 |
| 2 (1) | (70/30/2 20% aqueous ammonia) /2/3/0 | 0.4 | 0.6 | 1.4 |
| 2 (2) | (70/30/2 20% aqueous ammonia) /2/0/0 | 0.3 | 0.6 | 1.3 |

EXAMPLE 2

A phenol-formaldehyde resin was prepared by introducing 100 kg of phenol and 276 kg of formaldehyde in a 37% aqueous solution into a reactor, with stirring maintained throughout the manufacturing cycle, and the temperature in the reactor was raised to 45° C. The formaldehyde/phenol molar ratio was 3.2.

While keeping the temperature at 45° C., 12.7 kg of sodium hydroxide were regularly added over a period of 30 minutes, the sodium hydroxide being in a 47% aqueous solution, i.e. a sodium hydroxide/phenol weight ratio of 6%, i.e. a molar ratio of 14.1%.

Immediately after this addition, the temperature was raised to 70° C. over 30 minutes and this temperature was maintained for a time of about 130 minutes. After this time, the dilutability of the resol neutralized with sulphuric acid was 1200%.

The reactor and the reaction mixture were then cooled from 70° C. to 35° C. over 35 minutes.

The pH of the reaction mixture was then adjusted to 7.3 with sulfamic acid as a 15% aqueous solution (approximately 88 kg). The operation took about 90 minutes, while allowing the reaction mixture to cool down to 20° C.

The neutralized resol had a free formaldehyde content of 2.5% and a free phenol content of 0.5% by weight of the resol, for a solids content of 36%.

The dilutability of the resol neutralized with sulfamic acid was 1800% and changed to 1300% after three weeks' storage at 12° C. with gentle stirring.

This resin was used to formulate two sizing compositions based on a resol/urea premix, the formulations of which are given in Table 1.

These sizings were used as in Example 1 to manufacture an insulating product based on glass wool and the results of measurements on the gaseous emissions are given in Table 1.

Trial 1 shows that, despite the presence of aqueous ammonia in the sizing, the level of ammonia gas emitted remains tolerable, and may be very simply reduced if the aqueous ammonia is omitted, as the partial omission of aqueous ammonia in Trial 2 shows.

The level of formaldehyde and phenol emissions in these two trials were also very satisfactory.

What is claimed is:

1. An insulating product comprising a mineral wool sized with a phenol-formaldehyde resin binder, wherein the binder comprises, as a mixture:
   60 to 90 parts by weight of phenol-formaldehyde resol having a free formaldehyde content of less than or equal to 25% by weight with respect to the dry weight of resin and a free phenol content of less than or equal to 2.5% by weight with respect to the dry weight of resin, obtained by condensation in basic medium of phenol (P) and formaldehyde (F) in an F/P molar ratio of around 2.5 to 4, and wherein the phenol-formaldehyde resol has a water dilutability of greater than 500% and less than or equal to 1500%, as determined by neutralizing the resol with sulfuric acid; and
   10 to 40 parts by weight of urea.

2. The insulating product according to claim 1, wherein the F/P ratio is around 2.5 to 3.2.

3. The insulating product according to claim 1, wherein the mixture comprises 65 to 90 parts by dry weight of resol.

4. The insulating product according to claim 1, wherein the binder further comprises from 1 to 10 parts by weight of ammonium sulphite per 100 parts by dry weight of resol and urea.

5. The insulating product according to claim 3, wherein the mixture comprises 10 to 35 parts by weight of urea.

6. The insulating product according to claim 3, wherein the mixture comprises 15 to 30 parts by weight of urea.

7. The insulating product according to claim 3, wherein the mixture comprises 70 to 85 parts by dry weight of resol.

8. The insulating product according to claim 7, wherein the mixture comprises 10 to 35 parts by weight of urea.

9. The insulating product according to claim 7, wherein the mixture comprises 15 to 30 parts by weight of urea.

10. A process for manufacturing the insulating product of claim 1 comprising spraying the binder on to the mineral wool.

11. A process for manufacturing an insulating product comprising:
   reacting phenol (P) with formaldehyde (F) in an F/P molar ratio of around 2.5 to 4 in the presence of a basic catalyst to obtain a phenol-formaldehyde resol with the water dilutability of greater than 500% and less than 1500%,
   adding urea to the phenol-formaldehyde resol to obtain a binder mixture, and
   spraying the binder mixture on to a mineral wool.

12. The process according to claim 11, wherein the free phenol content in the resol before adding urea is less than or equal to 2% with respect to the dry weight of resol.

13. The process according to claim 12, wherein the free phenol content in the resol before adding urea is around 0.5 to 1.7%.

14. The process according to claim 11, wherein the free formaldehyde content before adding urea is less than or equal to 20% with respect to the dry weight of resin.

15. The process according to claim 11, wherein the basic catalyst is sodium hydroxide.

16. The process according to claim 11, wherein the phenol and formaldehyde are reacted at a temperature of around 50 to 80° C.

17. The process according to claim 16, wherein the temperature is around 60 to 75° C.

18. The process according to claim 16, wherein the temperature is about 70° C.

19. The process according to claim 11, wherein the reaction of phenol with formaldehyde the reaction for around 80 to 200 minutes.

20. The process according to claim 19, wherein the reaction the reaction for around 90 to 150 minutes.

21. The process according to claim 11 further comprising neutralizing the binder mixture with an acid or a salt thereof.

22. The process according to claim 21, wherein the acid or a salt thereof is selected from the group consisting of boric acid or an equivalent borate, sulfamic acid or an equivalent sulfamate, amino acid, and mixtures thereof.

23. The process according to claim 11, wherein the cumulative emissions of ammonia gas over all of the manufacturing steps are less than 10 grams of ammonia gas per kilogram of mineral wool.

* * * * *